United States Patent [19]

Kerschbaumer et al.

[11] Patent Number: 5,154,979
[45] Date of Patent: Oct. 13, 1992

[54] SHAPED ARTICLES MADE FROM THERMOPLASTIC POLYMERS

[75] Inventors: Franz Kerschbaumer, Chur; Heinz U. Gaehwiler, Domat/Ems, both of Switzerland

[73] Assignee: EMS-Inventa AG, Switzerland

[21] Appl. No.: 502,923

[22] Filed: Mar. 30, 1990

[30] Foreign Application Priority Data

Apr. 10, 1989 [DE] Fed. Rep. of Germany ....... 3911695

[51] Int. Cl.$^5$ .............................................. B32B 27/08
[52] U.S. Cl. ................................. 428/476.9; 428/483; 428/516; 428/520
[58] Field of Search ................. 428/474.4, 476.9, 483, 428/516, 520, 421

[56] References Cited

U.S. PATENT DOCUMENTS

| | | | |
|---|---|---|---|
| 3,884,882 | 5/1975 | Caywood, Jr. | 525/205 |
| 4,010,223 | 3/1977 | Caywood, Jr. | 525/285 |
| 4,945,008 | 7/1990 | Heyes et al. | 428/515 X |
| 4,999,252 | 3/1991 | Havens et al. | 428/515 X |

*Primary Examiner*—Thomas J. Herbert, Jr.
*Attorney, Agent, or Firm*—Jordan B. Bierman

[57] ABSTRACT

An article consisting of a base and one or more attachments thereto. The base is made of one thermoplastic polymer and the attachment is made of a second thermoplastic polymer which is at least partially incompatible with the first polymer. Either the first or second polymer contains 5 to 75% by weight of a third polymer which is an olefinic polymer having functional groups thereon. Either of the first two polymers may contain up to 90% of the usual additives. This enables the production of such articles with high interface strength.

36 Claims, 1 Drawing Sheet

SHAPED ARTICLES MADE FROM THERMOPLASTIC POLYMERS

The present invention is directed to formed articles which comprise individual portions which are made from components which are at least partially incompatible with one another. There is at least one olefinic component present and the articles themselves, especially when formed by injection welding or extrusion, are such that the individual parts are firmly joined together at their interfaces.

BACKGROUND OF THE INVENTION

Both polyamides and polyolefins have, for many years, been commonly used to form articles of all sizes and shapes. Each group of materials has its own advantages and drawbacks. More specifically, polyamides yield products having high rigidity and good resistance to many corrosive chemicals. However, they are subject to hydrolysis and possess a limited barrier effect against penetration by moisture. Moreover, their characteristics are such that, even if they are modified by elastomers, plasticization is possible only to a limited extent. On the other hand, polyolefins can be readily plasticized, have a high resistance to hydrolysis, and possess an excellent barrier to moisture or humidity.

Since there are many mechanical and electrical components which comprise pluralities of functional parts, it is not surprising to note that in many cases, a combination of flexible and rigid materials is required. Often, a flexible membrane is integrated into a rigid housing. At present, this is usually accomplished by screw connections or adhesive. However, methods of this type require hand labor and are time consuming and expensive.

A special injection welding technique is described in an article by R. Hagen in "Kunststoffe", 79 (1989), on pages 72 to 76. In accordance with this method, parts of *compatible* polymers can be joined without screws or adhesives. However, if one attempts this technique with *incompatible* thermoplastic polymers, they do not adhere to one another very well at their interfaces. Thus, some additional mechanical or other form of fixation is required. Moreover, the interfaces are not tight to either liquids or gases.

Thus, the injection welding and extrusion techniques will permit attachment of two thermoplastics to one another only if they have the same or a similar chemical structure. Moreover, even if two such similar materials are simultaneously injection molded or coextruded, mutual adhesion is obtained only if the thermoplastic with the higher softening or melting point is injected or extruded onto the one with a lower softening or melting point. If this technique is not followed, adhesion at the interfaces is generally poor.

OBJECTS OF THE INVENTION

It is, therefore, an object of the present invention to provide composite shapes of substantially incompatible materials. Moreover, such products of the present invention join well during shaping, especially by injection welding and extrusion. The products have excellent adherence at their interfaces and are impervious to passage of liquids or gases.

DESCRIPTION OF THE PRESENT INVENTION

There is provided a shaped article which comprises a base made of a first thermoplastic polymer and at least one attachment thereto made of a second thermoplastic polymer which is at least partially incompatible with the first polymer. It is a feature of the present invention that at least one of the first and second polymers is a mixture of that polymer with 5 to 75% by weight, based on that polymer, of a third polymer. The third polymer is an olefin homo and/or copolymer having functional groups thereon; the mixture may contain up to 90% of the usual additives. Such products have excellent interface adhesion and no solvents or adhesives are required.

A preferred form of the invention is directed to articles of the type described which have individual parts of polyolefin-modified polyamides, copolyamides, or blends thereof with polyolefins, copolyolefins, and blends thereof; or olefin-modified polyolefins, copolyolefins, or blends thereof with polyamides, copolyamides, or blends thereof.

By virtue of the present invention, integral functional parts of disparate type can be produced. For example, a rigid housing having a flexible surrounding membrane or sealing lip can be made by injection welding from a rigid thermoplastic polymer component and an extremely flexible one. Such items as light switches having flexible membrane covers, electric plugs having flexible water-type sealing lips, etc. are examples of products for which the present invention is useful.

Of course, the present invention is not limited to combinations of polyamides and polyolefins. Other materials which are at least partially incompatible can also be used or be contained in the finished articles. For example, polyesters, polymerized fluorinated hydrocarbons, polyoxymethylenes, acetals, as well as copolymers and blends thereof are useful in the present invention.

It is contemplated that the first and second polymers can contain up to 90% by weight of the usual additives. These include plasticizers, impact resistance modifiers, elastomeric polyamides, processing aids, heat stabilizers, UV stabilizers, flame proofing agents, pigments, especially [added to the polyamides] if polyamides are present. The first and second polymers can also contain reinforcing agents such as glass fibers, glass beads, mineral fillers, and carbon fibers.

In the form of the invention wherein the first polymer is a polyamide, the usual available commercial grades thereof are preferred. Polyamide 6; polyamide 6, 6; polyamide 11; polyamide 12; polyamide 6, 9; polyamide 6, 10; polyamide 6, 12; polyamide 12, 12; and mixtures or blends thereof are all both suitable and preferable for use in connection with the present invention. If the second polymer is a polyolefin, the usual commercial grades are entirely satisfactory and preferable. It has been found particularly desirable to use polyethylenes and/or polypropylenes.

The third polymer is a homo or copolyolefin which has functional groups thereon. Such groups may be either grafted onto the base molecule or polymerized therein. Polyolefins based on monomers having 2 to 8 carbon atoms are particularly suitable, whether as homopolymers or copolymers. Of particular suitability are the α-olefins, especially ethylene and propylene.

Insofar as the functional groups are concerned, it is preferable that they be capable of reacting with hydroxyl or amino groups. Thus, they will usually be acidic acting groups such as carboxyls, acid anhydrides, etc. They are grafted onto the base polymer and/or constitute links in the chain of the base molecule itself.

The carboxyl and acid anhydride groups have been found to be particularly suitable.

For the base molecule, copolymers of ethylene and higher α-olefins are desirable. In this category, most suitable are propylene, butene-1, hexene-1, and/or octene-1. For best results, this base should be grafted with maleic acid.

Advantageously, the melt index of the functionalized polyolefins which constitute the third polymer is desirably 0.1 to 30 g/10 minutes, when measured at 91° C. The range of 0.4 to 4.0 has been found especially suitable.

To incorporate the functional groups into the olefin polymers, maleic acid, maleic acid anhydride, fumaric acid, acrylic acid, and methacrylic acid are all very useful. Of course, mixtures thereof can also be used.

The copolymers preferably contain 0.1 to 5.0% by weight of functional groups. More preferably, 0.3 to 3.0% by weight of the functional groups is present. An advantageous third polymer is of ethylene and 15 to 40% by weight of propylene functionalized with acrylic acid or maleic acid anhydride.

In one form of the invention, the acid groups can be partially or completely neutralized by cations. Of particular value in this regard are sodium, zinc, and the like. More specifically, such cations may comprise 0 to 10% by weight based on the polyolefin. More desirably, 0.1 to 5% by weight is used.

As the functionalized polyolefin of the third polymer, addition products having 0.5 to 10% by weight of maleic acid anhydride, fumaric acid, acrylic acid, acrylic acid ester, vinyl acetate, and mixtures thereof, are formed with the polyolefins. The manufacturer of such materials is described in U.S. Pat. Nos. 3,884,882 and 4,010,223.

In producing the shaped articles of the present invention, the modified polyolefin can be incorporated into the first polymer, the second polymer, or both.

The polymers are processed by melting and homogenizing the components in a single or twin shaft screw kneader; suitable devices are produced by Buss (Pratteln, Switzerland) or Werner & Pfleiderer (Stuttgart, West Germany). However, it is also possible to use the individual components and a mechanical mixture of the remaining components directly by injection molding or extrusion.

The following Examples are intended to illustrate the Invention and are not limiting thereof. In the Examples, the relative solution viscosities set forth are derived from measurements in m-cresol or 97% sulfuric acid in accordance with the method set forth in DIN 53727. Polyamides 6 and 6,6 have been measured in sulfuric acid, polyamide 12 was measured in m-cresol.

In all cases, the articles were produced by mixing the components in a twin screw kneader ZSK 28 (Werner and Pfleiderer) or were processed directly as mixtures of the individual components by injection molding. The interface adhesion was determined in accordance with DIN 53455.

The base was first prepared by injection molding. Thereafter, the polymers to be attached were injection molded onto the bases. In Example 1, and in the Comparison Examples, each of the first and second polymers has been used as both the base and the attachment portion of the ultimate shape.

BRIEF DESCRIPTION OF THE DRAWING

The test bars as required by DIN 53455, are of the form shown in FIG. 1.

Test bar 1 is provided with base 2 onto which attachments 5 and 6 are injection welded. Interfaces 3 and 4 between the at least partially incompatible polymers are, in the sample, comparatively small and restricted.

Figure 1:
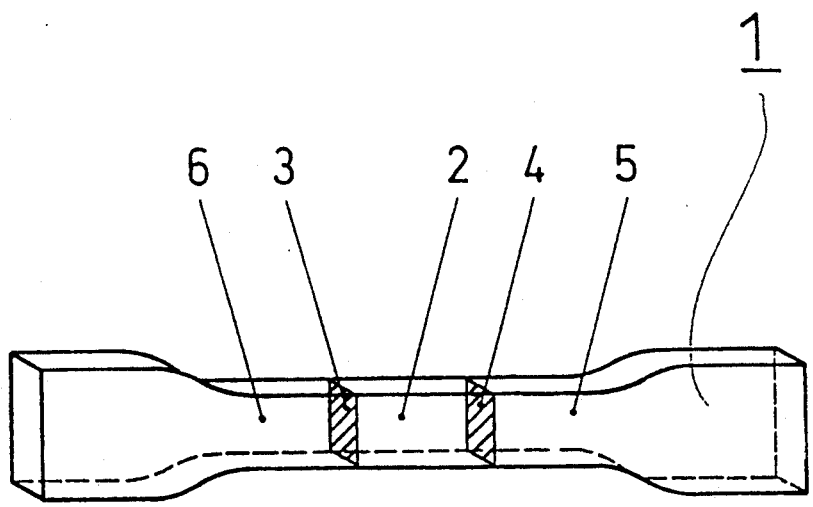

The composition and preparation of the various test components are set forth below and their use in the test method, as well as the results achieved, are set forth in Table 1.

COMPARISON EXAMPLE 1

75% by weight of polyamide 6 having a relative solution viscosity of 2.80 was homogenized and granulated with 25% by weight of conventional commercial glass fibers in a twin screw kneader (ZSK 28 type made by Werner & Pfleiderer).

COMPARISON EXAMPLE 2

75% by weight of polyamide 6/6 having a relative solution viscosity of 2.60 was homogenized and granulated with 25% by weight of conventional commercial glass fibers in the twin screw kneader.

COMPARISON EXAMPLE 3

75% by weight of polyamide 12 having a relative solution viscosity of 1.93 was homogenized and granulated with 25% by weight of conventional commercial glass fibers in the twin screw kneader.

EXAMPLE 1

25% by weight of polyamide 6 having a relative solution viscosity of 2.8 was homogenized and granulated with 50% by weight of polypropylene grafted with maleic acid anhydride and with 25% by weight of conventional commercial glass fibers in the twin screw kneader.

EXAMPLE 2

35% by weight of polyamide 6 having a relative solution viscosity of 2.8 was homogenized and granulated with 40% by weight of polypropylene grafted with maleic acid anhydride and with 25% by weight of conventional commercial glass fibers in the twin screw kneader.

EXAMPLE 3

38% by weight of polyamide 6 having a relative solution viscosity of 2.8 was homogenized and granulated with 37% by weight of polypropylene grafted with maleic acid anhydride and with 25% by weight of conventional commercial glass fibers in a twin screw kneader.

EXAMPLE 4

25% by weight of polyamide 6/6 having a relative solution viscosity of 2.6 was homogenized and granulated with 50% by weight of polypropylene grafted with maleic acid anhydride and with 25% by weight of conventional commercial glass fibers in the twin screw kneader.

EXAMPLE 5

35% by weight of polyamide 12 having a relative solution viscosity of 1.95 was homogenized and granulated with 40% by weight of polypropylene grafted with maleic acid anhydride and with 25% by weight of conventional commercial glass fibers in the twin screw kneader.

EXAMPLE 6

25% by weight of polyamide 12 having a relative solution viscosity of 1.95 was homogenized and granulated with 50% by weight of polypropylene grafted with maleic acid anhydride and with 25% by weight of conventional commercial glass fibers in the twin screw kneader.

EXAMPLE 7

50% by weight of 50% by weight glass fiber reinforced polyamide 12 was mechanically mixed with 50% by weight of polypropylene grafted with maleic acid anhydride. The mixture was injection molded directly into test pieces.

Santoprene 201-55 is a polypropylen filled with EPDM-Rubber
manufactured by Monsanto Kraton TC4 AAA is a SEBS-Copolymer (Styren-Ethylen-Buthylen-Styren-Blockcopolymer) manufactured by Shell

TABLE 1

| Base | Attachment | Interface |
| --- | --- | --- |
| Comparison Example 1 | Santoprene 201-55 | None |
| Comparison Example 2 | Santoprene 201-55 | None |
| Comparison Example | Santoprene 201-55 | None |
| Comparison Example 1 | Kraton TC4 AAA | None |
| Comparison Example 2 | Kraton TC4 AAA | None |
| Comparison Example 3 | Kraton TC4 AAA | None |
| Santoprene 201-55 | Comparison Example 1 | None |
| Santoprene 201-55 | Comparison Example 2 | None |
| Santoprene 201-55 | Comparison Example 3 | None |
| Kraton TC4 AAA | Comparison Example 1 | None |
| Kraton TC4 AAA | Comparison Example 2 | None |
| Kraton TC4 AAA | Comparison Example 3 | None |
| Example 1 | Santoprene 201-55 | 80 N |
| Example 1 | Kraton TC4 AAA | 120 N |
| Santoprene 201-55 | Example 1 | 100 N |
| Kraton TC4 AAA | Example 1 | 120 N |
| Example 2 | Santoprene 201-55 | 50 N |
| Example 2 | Kraton TC4 AAA | 50 N |
| Example 3 | Santoprene 201-55 | 50 N |
| Example 3 | Kraton TC4 AAA | 50 N |
| Example 4 | Santoprene 201-55 | 70 N |
| Example 4 | Kraton TC4 AAA | 80 N |
| Example 5 | Santoprene 201-55 | 50 N |
| Example 5 | Kraton TC4 AAA | 50 N |
| Example 6 | Santoprene 201-55 | 50 N |
| Example 6 | Kraton TC4 AAA | 70 N |
| Example 7 | Santoprene 201-55 | 40 N |
| Example 7 | Kraton TC4 AAA | 50 N |

While only a limited number of specific embodiments of the present invention have been expressly disclosed, it is, nonetheless, to be broadly construed, and not to be limited except by the character of the claims appended hereto.

What is claimed is:

1. A shaped article comprising a base and at least one portion adhered thereto, said base being of a first thermoplastic polymer, said portion being formed by injection welding and made of a second thermoplastic polymer at least partially incompatible with said first polymer, said portion being connected to said base at least one interface, at least one of said first polymer and said second polymer forming a mixture with 5 to 75% by weight, based on said mixture, of a third polymer which is an olefin homopolymer and/or copolymer, having functional groups thereon, whereby each polymer may contain up to 90% of additives.

2. The article of claim 1 wherein said first polymer is selected from the group consisting of polyamide 6; polyamide 6,6; polyamide 11, polyamide 12; polyamide 6, 9; polyamide 6, 10; polyamide 6, 12; polyamide 12, 12; and mixtures thereof.

3. The article of claim 1 wherein said second polymer is selected from the group consisting of polyethylenes, polypropylenes, and mixtures thereof.

4. The article of claim 1 wherein said first polymer and said second polymer are selected from the group consisting of polyesters, polymerized fluorinated hydrocarbons, polyoxymethylenes, polyacetals, copolymers thereof, and blends thereof.

5. The article of claim 1 wherein said additives are selected from the group consisting of plasticizers, impact resistance modifiers, elastomeric polyamides, processing aids, heat stabilizers, UV stabilizers, flame resistance agents, pigments, glass fibers, glass beads, mineral fillers, carbon fibers, and mixtures thereof.

6. The article of claim 1 wherein said functional groups are grafted on said third polymer.

7. The article of claim 1 wherein said functional groups are polymerized in said third polymer.

8. The article of claim 1 wherein said mixture is of said third polymer with said second polymer.

9. The article of claim 1 wherein said mixture is of said third polymer with said first polymer and of said third polymer with said second polymer.

10. The article of claim 1 wherein said third polymer is 35 to 50% by weight based on said first or second polymer.

11. The article of claim 1 wherein said third polymer is derived from monomers selected from the group consisting of maleic acid, maleic anhydride, acrylic acid, methacrylic acid, fumaric acid, acrylic acid ester, methacrylic acid ester, vinyl acetate, and mixtures thereof.

12. The article of claim 1 wherein said second polymer is a compound selected from the group consisting of a polyolefin, a copolyolefin, or a blend thereof.

13. The article of claim 1 wherein said third polymer is a homopolymer of at least one olefin having 2 to 8 carbon atoms.

14. The article of claim 13 wherein said olefin is selected from the group consisting of ethylene, propylene, and mixtures thereof.

15. The article of claim 1 wherein said olefin is an α-olefin.

16. The article of claim 15 wherein said third polymer is a copolymer with a monomer selected from the group consisting of maleic acid anhydride, acrylic acid, acrylic acid ester, fumaric acid, vinyl acetate, and mixtures thereof.

17. The article of claim 15 wherein said third polymer is a copolymer of ethylene with at least one higher α-olefin.

18. The article of claim 17 wherein said higher α-olefin is selected from the group consisting of propylene, butene, hexene, octene, and mixtures thereof.

19. The article of claim 1 wherein said third polymer has a melt index, at 91° C., of 0.1 to 30 g/10 minutes.

20. The article of claim 19 wherein said melt index is 0.4 to 4.0 g/10 minutes.

21. The article of claim 1 wherein said functional groups are capable of reacting with hydroxyl groups or amino groups.

22. The article of claim 21 wherein said functional groups are acidic.

23. The article of claim 22 wherein said functional groups are carboxyl or acid anhydride.

24. The article of claim 1 wherein said first polymer is a compound selected from the group consisting of a polyamide, a copolyamide, and a blend thereof.

25. The article of claim 24 wherein said additive is in said first polymer.

26. The article of claim 1 wherein said third polymer has 0.1 to 5.0% by weight, based on said third polymer, of said functional groups.

27. The article of claim 26 wherein said third polymer has 0.3 to 3.0% by weight, based on said third polymer, of said functional groups.

28. The article of claim 1 wherein said mixture is of said third polymer with said first polymer.

29. The method of claim 28 wherein said third polymer is intimately mixed with said first polymer and/or said second polymer.

30. A method of making the article of claim 1 comprising forming said base and injection welding or extruding said portion attachment thereon.

31. The method of claim 30 wherein said first polymer is a polyamide and said second polymer is a polyolefin.

32. The article of claim 1 wherein said third polymer is a copolymer of ethylene and propylene having a propylene content of 15 to 40% by weight and acrylic acid and/or maleic acid anhydride are said functional groups.

33. The article of claim 32 wherein said functional groups are at least partially neutralized by cations.

34. The article of claim 33 wherein said cations are $Na^+$ or $Zn^{++}$.

35. The article of claim 33 wherein said cations are 0 to 10% by weight of said third polymer.

36. The article of claim 35 wherein said cations are 0.1 to 5% by weight based on said third polymer.

* * * * *